March 30, 1965 K. E. FORSBERG 3,176,297

ANTENNA SYSTEMS

Filed Nov. 8, 1962 4 Sheets-Sheet 1

INVENTOR
KENNETH E. FORSBERG
BY S. C. Yeaton
ATTORNEY

INVENTOR
KENNETH E. FORSBERG
BY S. C. Yeaton
ATTORNEY

INVENTOR
KENNETH E. FORSBERG
BY S. C. Yeaton
ATTORNEY

INVENTOR.
KENNETH E. FORSBERG
BY
S. C. Yeaton
ATTORNEY

United States Patent Office 3,176,297

Patented Mar. 30, 1965

3,176,297

ANTENNA SYSTEMS

Kenneth E. Forsberg, Huntington, N.Y., assignor to Sperry Rand Corporation, Great Neck, N.Y., a corporation of Delaware Filed Nov. 8, 1962, Ser. No. 236,342
14 Claims. (Cl. 343—100)

This invention relates to microwave antenna systems and more particularly to electronically scanned monopulse antenna systems.

Various electronic scanning techniques have been devised. These techniques rely on a controllable phasing system to steer the beam of electromagnetic energy. The various techniques differ mainly in the kind of phasing system employed.

Many systems, for instance, employ variable delay lines between the individual antenna elements and the receiving system. Beam steering is accomplished by adjusting the delay lines so as to produce a phase differential between various antenna elements. This system however requires complex, high precision components to provide the required variable delay times.

Still other systems employ frequency sensitive phase shifting means so that the beam can be steered by changing the frequency. Such systems require wideband components. Furthermore, the frequency must be precisely controlled in order to obtain accurate steering.

Electronically scanned arrays are also known in which the transmission line sections contain ferromagnetic dielectric materials to provide the desired differential phase shifts. These systems however require active, high precision phasing elements and high beam control power.

Moreover, in each of these systems, duplicate phasing networks would be required for the simultaneous beam formation used in a monopulse system.

It is therefore an object of the present invention to provide an electronic scanning system that uses relatively simple passive elements.

It is another object of the present invention to provide an electronic scanning system that is capable of high range resolution.

It is still another object of the present invention to provide an electronic scanning system that can operate throughout a wide frequency range.

Yet another object of the present invention is to provide an electronically scanned monopulse antenna system wherein the same phasing elements can be used to receive signals simultaneously from two or more beams.

Briefly, these objects are achieved by providing a hybrid phasing matrix to receive electromagnetic radiation from a remote source and combining the output from two or more adjacent ports on the matrix so as to derive a combination of signals equivalent to the signals that would be obtained from a steerable monopulse antenna.

Other objects and advantages will be apparent from the following description and claims considered together with the accompanying drawings in which:

Figure 5A:
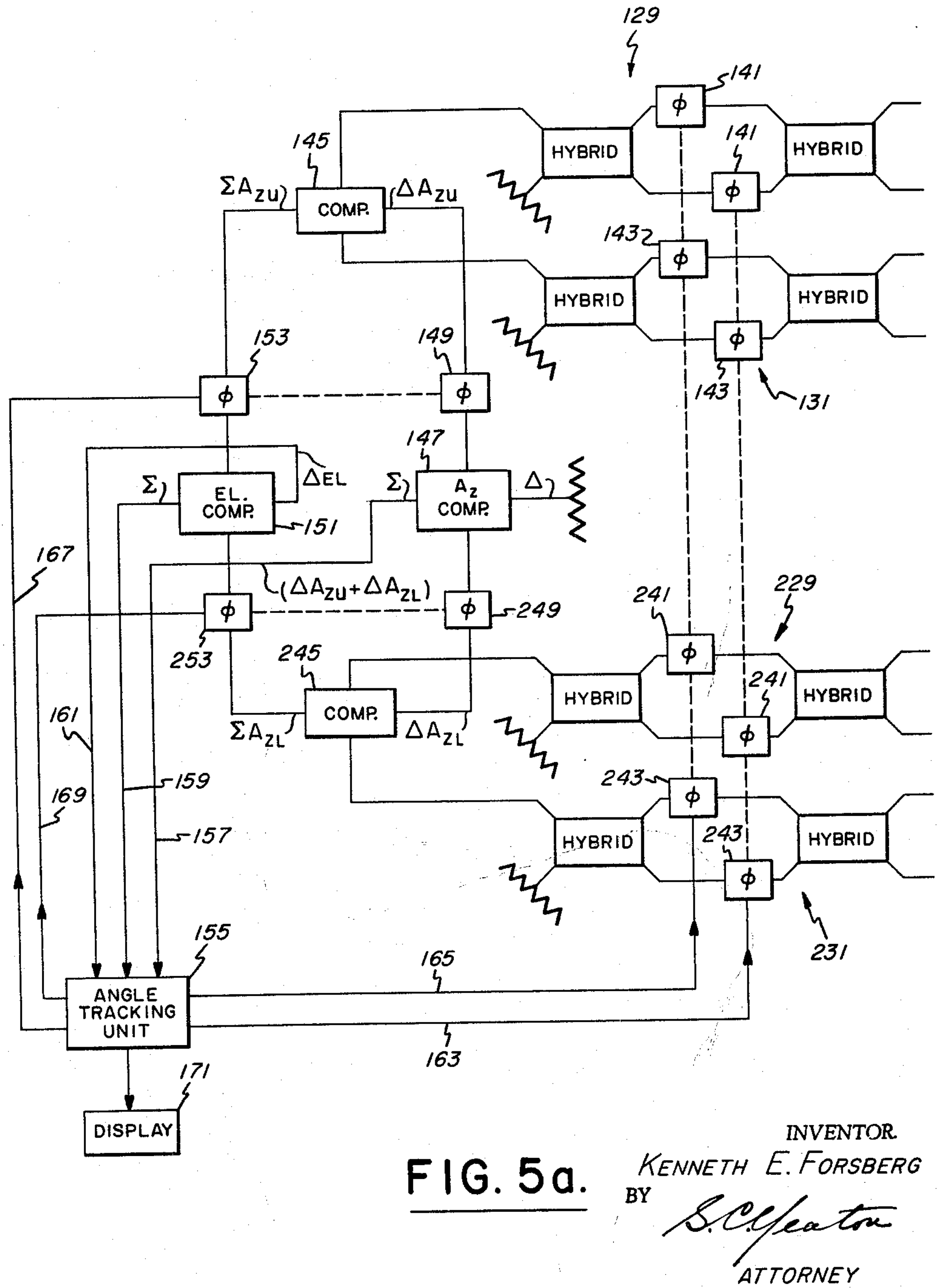
Figure 5B:
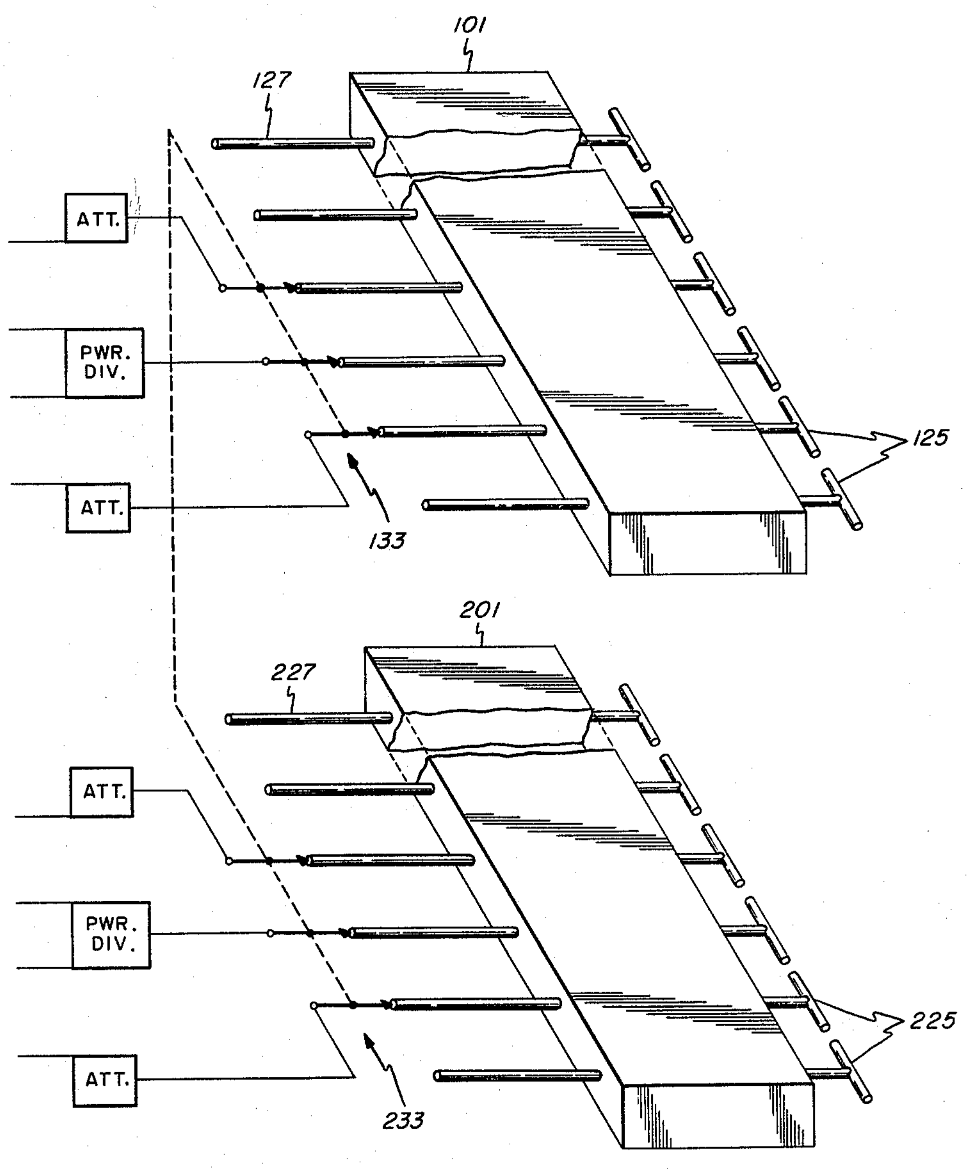

FIGS. 5*a* and 5*b* are block diagrams, partly in perspective, illustrating a dual plane scanning system embodying the principles of the invention.

Figure 1:
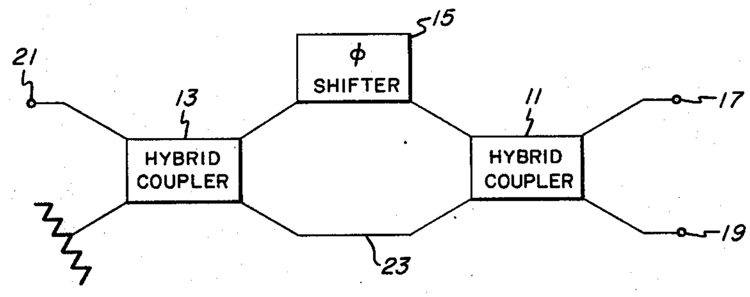
FIG. 1 is a block diagram of a beam adder useful in practicing the invention.

FIG. 1 illustrates a beam adder that can be used in the present invention. The beam adder contains a 3 DB input hybrid coupler 11, a 3 DB output hybrid coupler 13 and a variable microwave phase shifter 15. Any of the well-known types of hybrid couplers may be used for this purpose. Similarly, the microwave phase shifter can be fabricated from any conventional device capable of operating in the microwave frequency range. A presently preferred embodiment of the beam adder utilizes a strip transmission line for the hybrid couplers, and varactors for the phase shifters.

The output hybrid coupler, which serves as a combining means, can be replaced by a hybrid junction or hybrid ring if desired in which case the difference port would be terminated and the sum port would be used as the output port 21.

It can be shown that in-phase voltages fed into the input terminals 17 and 19 in various proportions, will appear at the output terminals of the hybrid coupler 11 as a pair of voltages that are equal in magnitude, but separated by a phase angle dependent upon the relative magnitude of the input voltages. The phase shifting means 15 can then be adjusted to compensate for this phase angle so that the two portions of energy can be combined in the output hybrid coupler 13 and directed solely to the output port 21.

Consider, for instance, the situation in which all of the available energy is fed into the terminal 17. The energy will divide at the hybrid 11 so that half will flow directly to the phase shifter and half will flow diagonally across the hybrid to the line 23. This portion of the energy flowing diagonally across the hybrid will experience a 90° phase shift. When this portion of the energy reaches the hybrid 13, some of it will flow diagonally across the hybrid to the output port 21, but will experience an additional 90° phase shift in the hybrid 13. If now, the phase shifter is set to provide a 180° phase shift, energy reaching the output port by way of the phase shifter will be in phase with the energy that reaches the output port by way of the line 23. Furthermore, energy that would normally reach the terminating impedance by way of the phase shifter is 180° out of phase with the portion that would normally reach this impedance by way of the line 23.

In the case in which energy is fed to the input terminal 19 only, the phase shifter can be set to provide zero phase shift. Energy reaching the output port 21 by way of the phase shifter will experience only the 90° phase shift contributed by the hybrid 11. Energy flowing to the port 21 through the line 23 will be shifted by 90° by the hybrid 13. Energy attempting to reach the terminating impedance by way of the line 23, however, is cancelled by energy flowing through the phase shifter, since this energy is shifted 180° in phase in passing diagonally across the two-hybrid elements.

Similarly, in intermediate situations, in which power is fed to both input terminals in various portions, the total power can be directed to the output port by setting the phase shifter to an appropriate value.

A beam adder has been illustrated in which only one phase shifter is used in order to simplify the explanation. It will be appreciated, however, that a second phase shifter can be added in the line 23. The phase shifters can then be operated in conjugate fashion so that the individual shifters produce equal but opposite phase shifts.

Figure 2:
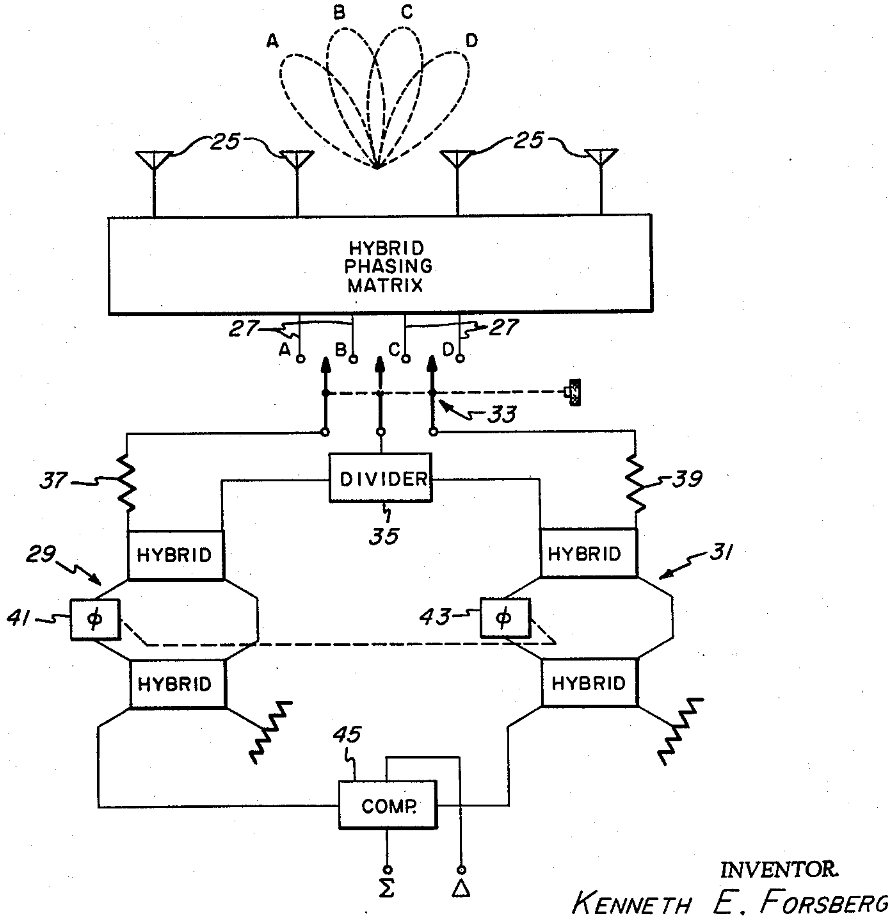
FIG. 2 is a block diagram illustrating one form of the invention.

FIG. 2 illustrates a single plane antenna scanning system utilizing the principles of the invention. A hybrid phasing matrix is used to provide an antenna array having the desired direction characteristics. Matrices of this type are described by Jesse Butler and Ralph Lowe in an article entitled: "Beam-Forming Matrix Simplifies Design of Electronically Scanned Antennas" appearing on pages 170–173 of Electronic Design Magazine for April 12, 1961.

In the hybrid phasing matrix, electrical connections are normally made through any one of the ports 27. Electro-magnetic energy is radiated or received through an array of antenna elements 25. At least one antenna is provided for each port. Each port is connected to all of the antenna elements through internal phase shifting networks. The networks are arranged to provide an incremental phase shift between individual antenna elements. This incremental phase shift is different for each port. Thus, energy fed into port A reaches the various antenna elements with an incremental phase shift that produces a radiated beam having the directional characteristics indicated in the polar plot as pattern A; energy fed into port B radiates according to pattern B, and so on. Since the matrix is passive and reciprocal, energy received by the antena elements emanates from the various ports in phase, but with amplitudes that vary according to these directional characteristics. The individual directional patterns may be made to have the same phase center by adjusting a fixed phase delay in series with each port. The ports may be physically arranged so that adjacent ports correspond to adjacent beams as indicated in FIG. 2.

Received energy emanating from the ports 27 is transferred to a pair of beam adders 29 and 31 through a triple pole, double throw switch 33. A power divider 35 conducts energy from the common switch arm to both beam adders. The outer switch arms are connected to the corresponding beam adders through the 3 DB attenuators 37 and 39. These attenuators compensate for the division of power occurring in the divider 35.

Energy from the beam adders is combined in a comparator 45. This comparator is a summing and differencing circuit such as a conventional ring hybrid.

When the switch 33 is in a position such that ports A, B, and C are connected to the beam adders, the system will accept energy from the cluster of the three corresponding beams.

If the beam adder 29 were used alone, the radiation pattern, in effect, could be shifted smoothly from beam A to beam B by varying the phase shifter 41. If beam adder 31 were used alone, the radiation pattern could be shifted smoothly from beam B to beam C by varying the phase shifter 43. When both beam adders are used, and both phase shifters are controlled synchronously, a pair of beams will be formed that can be moved smoothly from the positions A and B to the positions B and C.

Figure 3:
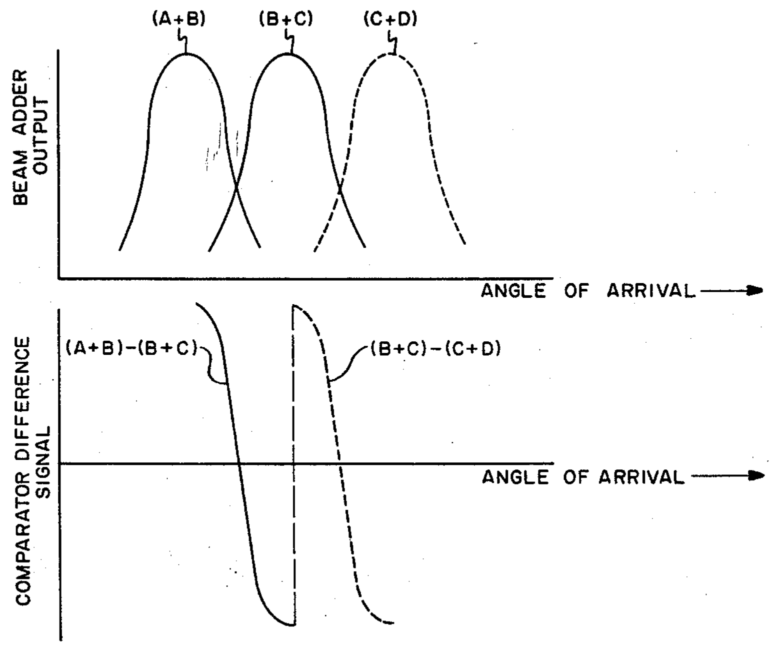
FIG. 3 is a graph useful in explaining the operation of the invention.

The operation of this system can be visualized by referring to FIG. 3 in which the radiation patterns have been plotted in orthogonal form for a given setting of the phase shifters. With the switch 33 engaging the ports A, B and C as previously assumed, the conditions represented by the solid curves will prevail. The output of the beam adder 29 corresponds to the sum of the radiation patterns of both beams A and B, and is represented by the composite curve $(A+B)$. Similarly, the output of beam adder 31 corresponds to the sum of the radiation patterns of both beams B and C, and is represented by the composite curve $(B+C)$. The null plane between these composite beams can now be used for amplitude monopulse tracking. The outputs of the two beam adders are combined in the comparator 45. The sum signal provides range information whereas the difference signal represented by the curve $(A+B)-(B+C)$ provides angle information in accordance with known amplitude monopulse techniques.

When the angle of arrival of the incident wave does not occur at the intersection of the $(A+B)$ and $(B+C)$ curves, a difference signal appears at the comparator output. The system can then be restored to balance by adjusting the phase shifters 41 and 43. This effectively moves both curves horizontally so that the intersection can be brought into coincidence with the angle of arrival of the incident wave.

The difference signal can be used in a conventional feedback network to adjust the phase shifters if desired.

When the switch 33 is in a position such that ports B, C and D are connected to the beam adders, the system will accept energy from a cluster of the corresponding beams. The scanning range is now shifted so as to cover the angle between the B and C beams and the C and D beams.

In this condition, the output of the beam adders 29 and 31 is represented by the curves $(B+C)$ and $(C+D)$ of FIG. 3 respectively. Angle information in this situation can be derived from the corresponding difference curve.

The switch 33, the divider 35, the beam adders 29 and 31, and the comparator 45 comprise an amplitude monopulse steering box that effectively steers a pair of radiation beam patterns as desired.

Since the number of antenna elements and ports in the hybrid phasing matrix can be increased, the overall scanning range of the system can be correspondingly extended by using a matrix with more sections.

FIG. 2 illustrates a system for electronically steering a beam in a single plane. It will be appreciated that systems can be combined to produce a multi-dimensional scan. A pair of systems can be used, for instance, in which the arrays are disposed in orthogonal planes to provide a dual-plane scanning system.

Furthermore, although a particular configuration for a one-dimensional amplitude monopulse steering box has been described, variations of this particular circuit are possible.

Figure 4:
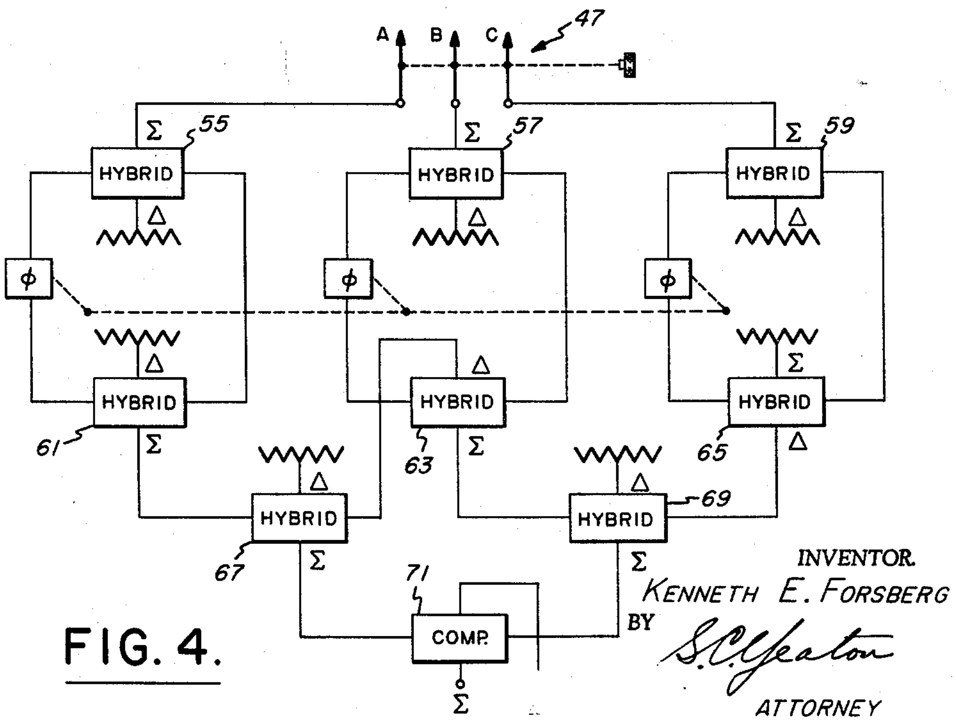
FIG. 4 is a block diagram illustrating another form of the invention.

The circuit of FIG. 4, for instance, may be used if desired. This particular circuit employs eight hybrids in addition to the comparator. Magic Tees, or the equivalent, may conveniently be used for these hybrids. Energy from the switch 47 is coupled to the sum ports of the input hybrids 55, 57, and 59. The difference ports of these hybrids are terminated. Energy from the collinear arms of these input hybrids is coupled to the corresponding collinear arms of the output hybrids 61, 63 and 65 through ganged adjustable phase shifters. The difference port of the hybrid 61 and the sum port of the hybrid 65 are terminated. The sum port of the output hybrid 61 and the difference port of the output hybrid 63 are coupled to a beam combining hybrid 67, whereas the sum port of the output hybrid 63 and the difference port of the output hybrid 65 are coupled to the collinear arms of a beam combining hybrid 69. The sum ports of the hybrids 67 and 69 are, in turn, coupled to the collinear arms of a comparator 71, whereas the difference ports are terminated. Sum and difference signals for range and angle information may be extracted from the comparator 71.

The operation of this circuit can be understood by assuming that the angle of arrival of an incoming signal is at one extreme of the range so that equal amounts of energy arrive at the arms A and B of the switch 47, and that no energy reaches the arm C. A difference signal will ordinarily appear at the comparator 71 until the phase shifters are adjusted. For the signal assumed, this will occur with the phase shifters set to provide zero phase shift. After this adjustment, the energy in the two collinear arms of the output hybrid 61 is in phase and thus is able to pass on to the hybrid 67. The energy from the arm B of the switch passes to the output hybrid 63 in a similar fashion. No energy appears at the difference terminal of this hybrid, but a signal does appear at the sum terminal from where it is coupled to one arm of the hybrid 69. Under the assumed condition, no energy reaches the arm C so that there is no signal at the output of the hybrid 65. The sum output of the hybrids 67 and 69 are equal and in phase. The sum of these signals appears at the sum output of the comparator 71. When the angle of arrival of the incoming signal is at the opposite extreme of the range so that the energy reaches the arms B and C in equal amounts, but no energy reaches the arm A, the phase shifters can be set to provide 180° phase shifts. Since no signal reaches arm A, no signal appears at the hybrid 61. The energy from the arms B and C now appears at the difference terminals of the hybrids 63 and 65 respectively. These signals are equal to each other and in phase. They are coupled to one collinear arm of the hybrid 67 and one collinear arm of the hybrid 69. The sum of these two signals appears at the output of the comparator 71. Since the signals coupled to the comparator 71 are equal and in phase, there is no difference signal at the output of the comparator.

For received signals having an angle of arrival somewhere between these two extremes, an intermediate setting of phase shifters can be found in which the difference signal from the comparator is reduced to zero and the sum signal is equivalent to the total energy received.

FIGS. *5a* and *5b* illustrate a dual plane electronic scanning system employing the principles of the present invention. The scanning system employes amplitude monopulse techniques for azimuth scanning and phase monopulse techniques for elevation scanning.

An upper hybrid phasing matrix 101 is arranged with its antenna elements 125 along a row in an azimuth plane. A lower hybrid phasing matrix 201 is arranged with its antenna elements 225 in a second azimuth plane so that the corresponding antenna elements of the two matrices are in vertically aligned columns. The matrices may contain any suitable number of antenna elements and a corresponding number of output ports 127 and 227 respectively. The three-pole switches 133 and 233 are ganged so as to selectively engage corresponding groups of three adjacent output ports in the upper and lower hybrid phasing matrices respectively. The beam adders 129 and 131 are coupled to receive energy from the switch 133 in accordance with the principles explained in reference to FIG. 2. Corresponding beam adders 229 and 231 are coupled to receive energy from the switch 233. A pair of phase shifters 141 are operated in conjugate fashion in the beam adder 129 to obtain the desired phase shift.

Although a single phase shifter may be used in each beam adder, the presently preferred embodiment of FIG. 5 employs pairs of phase shifters so that the individual shifters can be restricted to a smaller range of operating values. Similar pairs of phase shifters 143, 241 and 243 provide the necessary phase shift in the corresponding beam adders.

The ouputs of the beam adders 129 and 131 are combined in the upper comparator 145 from which upper sum and difference azimuth signals are obtained. These signals represent the energy received by the upper antenna elements 125. Similarly, lower sum and difference azimuth signals are obtained from the lower comparator 245 corresponding to the energy received by the lower antenna elements 225.

The difference azimuth signals are coupled to an azimuth comparator 147 through the adjustable elevation phase shifters 149 and 249. These phase shifters are connected to operate in conjugate fashion.

The sum of the upper azimuth signals from the comparator 145 is coupled to the elevation comparator 151 through the adjustable elevation phase shifter 153. The sum of the lower azimuth signals is coupled to the elevation comparator 151 through the adjustable elevation phase shifter 253. These two phase shifters are also operated in conjugate fashion. The phase shifters 149 and 249 may be replaced by a single phase shifter having twice the range of an individual shifter if desired. Similarly, the phase shifters 153 and 253 may be combined in a single unit.

The difference output port of the azimuth comparator 147 is terminated. The sum signal from this comparator as well as the sum and difference signals from the elevation comparator 151 are coupled to an angle tracking unit 155 through the transmission lines 157, 159 and 161 respectively.

The angle tracker combines these input voltages so as to provide output signals capable of operating the various adjustable phase shifters.

Amplitude monopulse systems determine the angle of arrival of the incoming wave of radio frequency energy in terms of the difference in amplitude between adjacent beams. Since the magnitude of this difference in amplitudes will change with variations in the strength of the incoming wave, means must be provided for relating the difference reading to the strength of the received wave. Various means have been devised for accomplishing this. Such means usually normalize the difference signal by deriving an output signal that is equivalent to the ratio of the magnitude of the difference signal to the magnitude of the sum signal. This ratio signal is then used in a feedback loop to restore the system to a condition of balance. A presently preferred angle tracking unit is described and claimed in the copending application of Susan K. Kamen and William L. Rubin, Serial No. 91,930, filed February 27, 1961, entitled "Single Channel Monopulse Radar Receiver," and assigned to the same assignee as the present application.

An azimuth error signal from the angle tracking unit is supplied to the phase shifters in the beam adders by way of the lines 163 and 165. This error signal may be a mechanical signal such as the output of a servo for use with mechanically actuated phase shifters, or an electrical signal for use with ferrite or varactor phase shifters. In either case, the signal in line 163 is out-of-phase with the signal in line 165 so that the beam adders are all driven in synchronism, but the individual phase shifters in each beam adder are driven in conjugate fashion.

Similarly, an elevation angle error signal is coupled to the phase shifters 149 and 153 by way of the line 167, while an oppositely-phased elevation angle error signal is coupled to the phase shifters 249 and 253 by way of the line 169.

A suitable display means can be actuated in conjunction with the angle tracking unit according to known techniques.

To better understand the operation of this embodiment of the invention, assume that a target lies on a line perpendicular to the geometrical center of the plane containing the antenna elements so that energy from this target arrives at the antenna elements with zero elevation and phase angles. Assume further that the various adjustable phase shifters have been set for this condition. Equal output will be obtained from each beam adder so that there will be no difference output from the comparator 145 or the comparator 245. These comparators will produce sum outputs, however, and these outputs will be equal and in phase with each other. The phase shifters 153 and 253 provide zero phase shift for this position of the target so that the energy reaching the elevation comparator 151 from each of the comparators 145 and 245 remains in phase and equal in amplitude. No difference signal is derived from the elevation comparator 151 under these conditions. A sum signal is obtained, however, and passes through the angle tracking unit and to the display means.

Assume now that the target moves straight upward so that an elevation error signal is produced. A given wave front of energy will reach the antenna elements 225 later than it reaches the elements 125. The sum signals from the comparators 145 and 245 will be shifted in phase accordingly and an error signal will appear at the difference port of the comparator 151. This error signal is processed in the angle tracking unit and appears on the lines 167 and 169 in a form that tends to drive the elevation phase shifters 153 and 253 until these units produce a phase shift that just counteracts the difference in phase between the sum signals derived from comparators 145 and 245. The difference signal from the elevation comparator 151 returns to zero under these conditions. The amount of phase shift required to restore the system to balance can be presented on the display means 171 as an indication of the elevation of the target. Since the target has not moved in azimuth, there is no difference output from the comparators 145 and 245.

If, now, the target is moved in azimuth, difference signals will appear at the comparators 145 and 245. These signals will be equal in amplitude, but displaced in phase since the target had previously been moved from its initial position of zero elevation. The phase displacement between the difference signals, however, is the same as the phase displacement experienced by the sum signals from the comparator 145 and 245. The phase displacement of the sum signals was counteracted by adjustment of the elevation phase shifters 153 and 253. The phase shifters 149 and 249 are ganged with the phase shifters 153 and 253 respectively, so that the difference signals from the comparators 145 and 245 reach the azimuth comparator 147 in phase with each other. The sum ouput of the comparator 147 is coupled to the angle tracking unit 155 and causes an error signal to appear on the lines 163 and 165. This error signal acts to adjust the phase shifters in the various beam adders until the difference outputs of the comparators 145 and 245 approach zero. The amount of correction necessary to restore the system to balance can be used as an indication of the azimuth angle and presented on the display means 171.

The system thus provides means for electronically steering a beam in both azimuth and elevation. As the target moves out of range in azimuth, the switches 133 and 233 can be moved one position so as to shift the beams into the adjacent azimuth range.

Since the hybrid couplers and junctions of the present invention are relatively simple, passive elements, the overall system can be made rugged and reliable. Moreover, these elements can be made to operate over a reasonably wide band of frequencies so that the entire system can be designed for broadband operation.

The system normally operates at a single frequency, and thus it can provide a high degree of range resolution.

Although the system that has been described is primarily intended for reception, the same system can be used for transmission since the elements are passive and reciprocal. Energy to be radiated can be fed into the appropriate sum terminals, for instance, and the phase shifter can be adjusted according to any convenient program.

The various arrays have been described as lying in horizontal rows and vertical columns. Although the arrays are ordinarily oriented in this fashion, it is to be understood that the arrays can be disposed in other planes if desired.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. An electronically steerable antenna system comprising a hybrid phasing matrix, a plurality of output terminals on said matrix, a first hybrid coupler connected to receive energy from a pair of said output terminals, a variable phase shifting means, a second hybrid coupler connected to receive energy from one output terminal of the first hybrid coupler through the phase shifting means, said second hybrid coupler being further connected to receive energy from the other output terminal of the first hybrid coupler, and an output port on the second hybrid coupler to transmit substantially all of the energy to utilization means.

2. An electronically steerable antenna system comprising a hybrid phasing matrix, a pair of output terminals on said matrix, conversion means to convert a magnitude difference between signals from said pair of output terminals into a corresponding phase difference, adjustable phase shifting means to further vary the phase difference between the signals from said conversion means, and an output hybrid coupled to receive the entire output of said conversion means, said output hybrid being further coupled to receive signals through said phase shifting means.

3. An electronically steerable antenna system comprising a hybrid phasing matrix, a plurality of output terminals on said matrix, an output hybrid coupler connected to a pair of said output terminals to provide two output signals separated by a phase angle dependent upon the relative magnitude of the signals from said pair of output terminals, variable phase shifting means, and a combining means coupled to receive both output signals from said hybrid coupler, said combining means being further coupled to receive at least one of said signals through said phase shifting means.

4. A steerable monopulse system comprising a hybrid phasing matrix, a plurality of output terminals on said matrix, switching means for selectively coupling groups of three adjacent output terminals to receiving apparatus, adjustable phase shifting means to couple energy from a first pair of the selected terminals to a first combining means, adjustable phase shifting means to couple energy from a second pair of the selected terminals to a second combining means, and comparison means to derive an error signal when the outputs of the two combining means are unequal.

5. A steerable monopulse system comprising a hybrid phasing matrix, a plurality of output terminals on said matrix, switching means for selectively communicating with groups of three adjacent output terminals, a first beam adder for combining the energy received from a first pair of adjacent terminals in a selected group, a second beam adder for combining the energy received from a second pair of adjacent terminals in the same selected group, and comparison means for producing an error signal whenever the output of the two beam adders is unequal.

6. A steerable monopulse antenna comprising:
(*a*) an array of at least 4 antenna elements,
(*b*) a hybrid phasing matrix coupled to said antenna elements,
(*c*) output terminals on said hybrid phasing matrix,
(*d*) a three-pole switch arranged for selective engagement with groups of three adjacent output terminals,
(*e*) a first beam adder connected to receive energy from a first and a second arm of said switch,
(*f*) a second beam adder connected to receive energy from the second and a third arm of said switch,
(*g*) an adjustable phase shifting means in each beam adder, and
(*h*) a comparator coupled to receive energy from each beam adder.

7. A monopulse steerable antenna system comprising:
(*a*) an array of antenna elements,
(*b*) a hybrid phasing matrix connected to receive energy from the antenna elements,
(*c*) a plurality of output terminals on said matrix,
(*d*) a first beam adder connected to a first and a second of said output terminals,
(*e*) a second beam adder connected to the second and a third of said output terminals,
(*f*) a first output port on each beam adder,
(*g*) terminating impedances connected to each of said first output ports,
(*h*) a second output port on each beam adder, and
(*i*) a comparator coupled to receive energy from each of said second output ports.

8. A monopulse steerable antenna system comprising:
(a) an array of antenna elements,
(b) a hybrid phasing matrix coupled to said antenna elements,
(c) output terminals on said hybrid phasing matrix,
(d) a first beam adder connected to a first and a second of said output terminals,
(e) a second beam adder connected to the second and a third of said output terminals,
(f) an output port on each beam adder,
(g) a comparator coupled to receive energy from each of said beam adders, and
(h) adjustable phase shifting means in each beam adder to direct substantially all of the energy entering the beam adder to the output port.

9. A monopulse steerable antenna system comprising:
(a) an array of antenna elements,
(b) a hybrid phasing matrix connected to receive energy from the antenna elements,
(c) a plurality of output ports on said matrix,
(d) a first hybrid coupler connected to a first and a second of said output ports,
(e) a second hybrid coupler connected to the second and a third of said output ports,
(f) third and fourth hybrid couplers connected to receive energy from said first and second hybrid couplers respectively,
(g) phase shifting means interposed between said first and third hybrid couplers,
(h) additional phase shifting means interposed between said second and fourth hybrid couplers, and
(i) a comparator coupled to receive energy from both the third and fourth hybrid couplers.

10. A monopulse steerable antenna system comprising:
(a) an array of antenna elements,
(b) a hybrid phasing matrix connected to receive energy from the antenna elements,
(c) a plurality of output ports on said matrix,
(d) a first hybrid coupler connected to a first and a second of said output ports,
(e) a second hybrid coupler connected to the second and a third of said output ports,
(f) third and fourth hybrid couplers connected to receive energy from said first and second hybrid couplers respectively,
(g) phase shifting means interposed between said first and third hybrid couplers,
(h) additional phase shifting means interposed between said second and fourth hybrid couplers, and
(i) utilization means connected to receive energy from both the third and the fourth hybrid couplers.

11. A steerable monopulse system comprising:
(a) an array of antenna elements,
(b) a hybrid phasing matrix coupled to said antenna elements,
(c) a plurality of at least four output terminals on the hybrid phasing matrix,
(d) a three-pole switch arranged for selective engagement with groups of three adjacent output terminals,
(e) a first beam adder,
(f) means to couple half of the energy entering the first and the second arms of said switch to the first beam adder,
(g) a second beam adder,
(h) means to couple half of the energy entering the second and the third arms of said switch to the second beam adder,
(i) an output port on each beam adder, and
(j) a comparator connected to both output ports.

12. A steerable monopulse antenna system comprising:
(a) a hybrid phasing matrix,
(b) a plurality of output ports on said matrix,
(c) first, second, and third input hybrids coupled to receive energy from three adjacent output ports respectively,
(d) individual adjustable phase shifting means coupled to each input hybrid,
(e) first, second, and third output hybrids coupled to the respective input hybrids through said phase shifting means,
(f) sum and difference ports on each output hybrid,
(g) a first beam combining hybrid coupled to the sum port of the first output hybrid and to the difference port of the second output port,
(h) a second beam combining hybrid coupled to the sum port of the second output hybrid and to the difference port of the third output hybrid, and
(i) a comparator coupled to receive sum signals from both beam combining hybrids.

13. A dual plane steerable monopulse system comprising:
(a) an upper antenna array disposed in an azimuth plane,
(b) a lower antenna array disposed in a second azimuth plane so as to be vertically aligned with the upper array,
(c) a hybrid phasing matrix coupled to each antenna array,
(d) a plurality of output terminals on each matrix,
(e) upper and lower amplitude monopulse steering boxes coupled to receive energy from three adjacent terminals on the upper and lower hybrid phasing matrices respectively,
(f) adjustable azimuth phase shifting means in each amplitude monopulse steering box,
(g) first and second adjustable elevation phase shifting means,
(h) an azimuth comparator coupled to receive difference output signals from both the upper and lower monopulse steering boxes through said elevation phase shifting means,
(i) an elevation comparator coupled to receive sum output signals from both the upper and lower monopulse steering boxes through said elevation phase shifting device,
(j) an angle tracking unit coupled to receive error signals from both the elevation and the azimuth comparators,
(k) means to couple a correction signal to said adjustable elevation phase shifting means whenever an error signal appears at the output of the elevation comparator, and
(l) means to couple a correction signal to said adjustable azimuth phase shifting means whenever an error signal appears at the output of the azimuth comparator.

14. A dual plane steerable monopulse system comprising:
(a) an upper antenna array disposed in an azimuth plane,
(b) a lower antenna array disposed in a second azimuth plane so as to be vertically aligned with the upper array,
(c) a hybrid phasing matrix coupled to each antenna array,
(d) a plurality of output terminals on each matrix,
(e) a first upper beam adder coupled to receive energy from a first and a second output terminal of said upper hybrid phasing matrix,
(f) a second upper beam adder coupled to receive energy from the second and a third output terminal of said upper hybrid phasing matrix,
(g) first and second lower beam adders coupled to receive energy from the corresponding first, second, and third output terminals on the lower hybrid phasing matrix,
(h) an output port on each beam adder,
(i) adjustable phase shifting means in each beam adder,
(j) an upper and a lower comparator to receive energy from both upper beam adders and both lower beam adders respectively, (*k*) first and second adjustable elevation phase shifting means, (*l*) an azimuth comparator coupled to receive difference output signals from both the upper and the lower comparators through said first elevation phase shifting means, (*m*) an elevation comparator coupled to receive sum output signals from both the upper and the lower comparators through said second elevation phase shifting means, (*n*) an angle tracking unit coupled to receive sum and difference signals from the elevation comparator and sum signals from the azimuth comparator, (*o*) a first feedback means interconnecting the angle tracking unit and said elevation phase shifters for adjusting these phase shifters whenever a difference signal appears at the output of the elevation comparator, and (*p*) a second feedback means interconnecting the angle tracking unit and the phase shifters in said beam adders for adjusting these phase shifters whenever a sum signal appears at the output of the azimuth comparator.

References Cited by the Examiner

UNITED STATES PATENTS

| | | |
|---|---|---|
| 2,848,714 | 8/58 | Ring. |
| 3,090,956 | 5/63 | Woodward et al. |

OTHER REFERENCES

Electronic Design, April 12, 1961, pp. 170–173, vol. 9, No. 8.

CHESTER L. JUSTUS, *Primary Examiner.*